United States Patent Office 3,272,701
Patented Sept. 13, 1966

3,272,701
FREE FLOWING MEDICATED DRINKING WATER FOR POULTRY AND ANIMALS
Charles Kaitz, Vineland, N.J., and Leon Merson, Los Angeles, Calif., assignors, by mesne assignments, to Vineland Laboratories, Inc., Landis Township, N.J., a corporation of New Jersey
No Drawing. Filed Feb. 27, 1962, Ser. No. 176,138
5 Claims. (Cl. 167—53)

This invention relates to a composition which is particularly useful in drinking water for poultry and animals.

Medicated drinking water containing therapeutic substances such as water soluble and water dispersible antibiotics and vitamins has recently come into extensive use for therapeutic purposes in the poultry and animal husbandry industries. Usually, the medicated drinking water is transmitted from a central source of supply to drinking troughs in the poultry and animal pens through automatic metering systems by which the water level in the troughs is controlled through the use of floats and valves. In most cases, the floats and valves cooperate with the smallest apertures in the lines of the metering system and a serious problem of clogging at these points has been experienced when medicated drinking water has been supplied through the system. This problem arises from the fact that many of the vitamins and antibiotics are not completely soluble in water and, as a result, insoluble residues tend to accumulate in and around the narrow orifices associated with the valves and floats of the metering system. The problem is further aggravated by the fact that the insoluble residues deposited in the narrow orifices tend to swell over a period of time and, during periods when poultry and animals drink low volumes of water, the residues tend to accumulate rather than become flushed away since the water is only statically held in the metering system. This problem has become so severe as to dissuade many poultry and animal farm keepers from using medicated drinking water, although the benefits thereof are still desired.

We have now discovered that the addition of small amounts of certain quaternary ammonium salts to medicated drinking water containing mixtures of vitamins or vitamins and antibiotics improves the characteristics of the aqueous composition in some unknown manner to such an extent that the deposition and accumulation of insoluble residues in automatic metering systems is virtually completely prevented. As a result, the medicated drinking water can be continuously supplied over prolonged periods of time without any problems of clogging or other restriction in flow. This is of great advantage commercially since the clogging problem heretofore experienced required the entire metering system to be dismantled at the valve and float locations and thoroughly cleaned mechanically before the system could again be operated satisfactorily. Elimination of the time and effort required for so cleaning the system constitutes a substantial economic savings in the cost of raising poultry and animals.

While we do not completely understand the reasons for our results, we have noted that the quantity of insoluble residues normally associated with the vitamins and antibiotics in many cases is reduced when the quaternary ammonium salt is added to the medicated drinking water. At the same time, physical solubilization of a greater proportion of the insoluble residues by the quaternary ammonium salts cannot be solely responsible for our results since, with certain of the quaternary ammonium salts, increased solubilization does not take place to any significant extent. Yet, even in this case, the quaternary ammonium salt is effective for preventing clogging of the metering systems. Whatever may be the actual explanation for the effect of the quaternary ammonium salt there is no doubt that the remarkable results achieved by our invention have great commercial importance and significance.

In accordance with our invention the quaternary ammonium salts which may be used to improve the characteristics of the medicated drinking water are represented by the following formula:

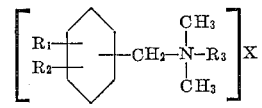

in which $R_1$ is selected from the group consisting of hydrogen and alkyl radicals having 1 to 4 carbon atoms, $R_2$ is selected from the group consisting of hydrogen and alkyl radicals having from 10 to 16 carbon atoms, $R_3$ is selected from the group consisting of alkyl radicals having from 1 to 18 carbon atoms, aryl radicals, alkoxy radicals and arylalkoxy radicals, and X represents an inorganic anion such as halogen, hydroxyl, carbonate, bicarbonate or sulfate. In general, the higher molecular weight quaternary ammonium salts are preferred where the $R_3$ group contains at least eight carbon atoms. These quaternary ammonium salts are water soluble materials and available commercially. Specific examples of quaternary ammonium salts which may be employed in our invention include diisobutylphenoxyethoxyethyl dimethyl benzyl ammonium chloride, benzyl dimethyl dodecyl ammonium chloride, dodecyl benzyl trimethyl ammonium carbonate, octadecyl dimethyl benzyl ammonium chloride, ethylbenzyl octyl dimethyl ammonium chloride, benzyl dimethyl hexyl ammonium chloride and benzyl dimethyl butoxy ammonium chloride.

The quaternary ammonium salt is simply dissolved in the drinking water which already contains mixtures of vitamins or mixtures of vitamins and antibiotics. The various vitamins which are used in medicated drinking water for poultry and animals includes vitamins A, $B_1$, $B_6$, $B_{12}$, D, E, d-calcium pantothenate, niacin, riboflavin and menadione. Although any one of these vitamins may be used alone in drinking water, the customary commercial practice is to employ mixtures of a number of vitamins. Also, antibiotics such as procaine penicillin, penicillin, streptomycin, tetracyclines, and bacitracin may be included in the medicated drinking water. Again, only one of the antibiotics may be employed but the usual practice is to use a mixture of two or more of the antibiotics alone or in combination with the vitamins.

While the quaternary ammonium salt may be added to drinking water containing only one vitamin or one antibiotic to obtain improved anti-clogging effects, the most significant benefits of the invention are realized when the quaternary ammonium salt is used with drinking water containing a substantial number of different vitamins and antibiotics where the likelihood of clogging is greatest and where the prevention thereof is, in like manner, most remarkable. Furthermore, the mixture of different vitamins and antibiotics provides a balanced therapeutic effect for the poultry and animals.

Generally speaking, the quantity of vitamins and antibiotics is such that the medicated drinking water contains from about 700 to about 1200 parts per million of the therapeutic substances by weight of the solution. At these levels the quaternary ammonium salts may be dissolved in amounts so as to give from about 25 to about 150 parts per million of the quaternary ammonium salt by weight of the solution or about 4% to about 13% of quaternary ammonium salt by weight based on the weight of the therapeutic substances.

In some instances, the addition of quaternary ammonium salts will be effective for causing increased solubilization of those vitamins and antibiotics which are only partially water soluble and this effect can be noticed visually by the reduction in the turbidity of the aqueous solution. In other cases, however, such increased solubilization can not be visually detected, but the aqueous solution will nevertheless be free-flowing and effective for preventing clogging in the automatic metering system through which it is fed.

The following examples constitute specific embodiments of the invention but it will be understood that they are given only by way of illustration and not intended to limit the scope of the invention.

*Example 1*

Two poultry houses each containing 1500 adult Leghorn chickens were employed in this test. Each house was equipped with 18 automatic float and valve fountains through which drinking water was dispensed into a corresponding number of drinking troughs from a central supply source. Medicated drinking water was supplied to house No. 1 through the fountains with each gallon of the water containing the following vitamins and antibiotics in the stated amounts:

| | |
|---|---:|
| Procaine penicillin G., units | 245,000 |
| Streptomycin, mgs. | 290 |
| Vitamin A, U.S.P. units | 16,100 |
| Vitamin B–12 activity, mcg. | 77 |
| Vitamin $D_3$, I.C. units | 490 |
| Vitamin E, int. units | 6 |
| Pyridoxine ($B_6$), mgs. | 7 |
| d-Calcium pantothenate, mgs. | 38 |
| Niacin, mgs. | 60 |
| Riboflavin, mgs. | 6 |
| Menadione sodium bisulfate, mgs. | 10 |

The same medicated drinking water was supplied to the fountains of house No. 2 except that p-diisobutylphenoxyethoxyethyl dimethyl benzyl ammonium chloride was added in the concentration of 100 parts per million to the drinking water. The condition of the automatic float and valve fountains in each house was periodically observed over a number of days with the following results.

One day after the start of the test, all of the fountains in both houses Nos. 1 and 2 were flowing freely with no diminution in the rate of flow. On the second day, the rate of the flow of water through two of the fountains in house No. 1 had decreased noticeably while all fountains were free-flowing in house No. 2. On the third day, two fountains were completely clogged in house No. 1 with no water flowing through at all and nine other fountains were clogged to the point where only droplets of water were slowly trickling out. The flow of water through all of the fountains in house No. 2 was still full and unrestricted with no diminution. On the fourth day, all of the fountains in house No. 1 were entirely clogged and no water was being dispensed into the drinking troughs. All fountains in house No. 2, on the other hand, were free-flowing with no diminution in the rate of flow.

At this time, the fountains in house No. 1 were dismantled and cleaned, and ordinary unmedicated water was run through the watering system in this house for the remainder of the test. The medicated drinking water containing the quaternary ammonium salt was continued through the metering system supplying the fountains of house No. 2. Seventeen days later and three weeks after the start of the test, the flow of water through the fountains in house No. 2 was as strong as that of the ordinary untreated water in house No. 1. Furthermore, the flow rate in house No. 2 was as strong as at the start of the test with no diminution whatsoever in the rate of flow.

*Example 2*

This test was carried out with the same equipment as that used in Example 1. This time medicated drinking water was supplied to the fountains of house No. 1 which contained the following vitamins in the stated amounts in each gallon of water:

| | |
|---|---:|
| Vitamin A, U.S.P. units | 8000 |
| Vitamin B-12 activity, mcg. | 80 |
| Vitamin $D_3$, I.C. units | 8000 |
| d-Calcium pantothenate, mg. | 96 |
| Menadione sodium bisulfate, mg. | 4 |
| Niacin, mg. | 110 |
| Riboflavin, mg. | 30 |

The water supplied to house No. 2 contained the same ingredients except that 100 parts per million of p-diisobutyl-cresoxyethoxyethyl dimethyl benzyl ammonium chloride was included as an additional ingredient. The respective medicated drinking waters were supplied to houses No. 1 and 2 continuously over a period of time and the condition of the water fountains was periodically observed with the following results.

On the first day following the start of the test, all fountains in both houses were free-flowing with no diminution in rate of flow. On the second day following the start of the test, one of the fountains in house No. 1 showed a noticeable reduction in rate of flow while all fountains in house No. 2 remained free-flowing. On the third day following the start of the test, three fountains in house No. 1 were completely closed with no water coming through and twelve fountains were operating very slowly under severely reduced rates of flow. All fountains in house No. 2 were free-flowing with no diminution in rate of flow. On the fourth day following the start of the test, all except one of the fountains in house No. 1 were completely closed and the water was flowing through the one remaining open fountain at a slow trickle. On the other hand, all fountains in house No. 2 were free-flowing with no diminution in rate of flow.

At this time, the water fountains in house No. 1 were dismantled and cleaned by removal of the insoluble residues deposited in the valve and float orifices. Thereafter, ordinary unmedicated water was supplied to house No. 1 while house No. 2 continued to receive the medicated drinking water containing the quaternary ammonium salt. Three weeks following the start of the test, the rate of flow through the fountains in house No. 2 was as strong as at the start of the test and the same as that of the ordinary untreated drinking water being supplied to house No. 1.

*Example 3*

The same equipment was used for this test as that of Examples 1 and 2. However, in this example, house No. 1 was supplied with medicated drinking water of the formulation used in Example 1 while house No. 2 was supplied with medicated drinking water of the formulation of Example 2. Into both aqueous formulations was dissolved 50 parts per million of the quaternary ammonium salt used in Example 1, exactly at half the amount it was used in Example 1. The fountains in houses Nos. 1 and 2 were continuously supplied with the respective medicated drinking waters over a two weeks period and the condition of the fountains was periodically noted during this time.

At the end of the two weeks, all of the fountains in both houses were free-flowing with no diminution in the rate of flow and at no time during the two week period could a reduction in the rate of flow through any of the fountains be observed. This example shows that the quaternary ammonium salt was effective for preventing clogging of the fountain orifices when used at only half the concentrations employed in Examples 1 and 2.

*Example 4*

A number of quaternary ammonium salts were evaluated for effectiveness in clearing up turbidity of medicated drinking waters with the p-diisobutylphenoxyethoxyethyl dimethyl benzyl ammonium chloride of Example 1 being taken as a standard. Two standard solutions were employed, one containing the vitamin and antibiotic mixture of Example 1 and the second containing the vitamin mixture of Example 2. These standards were prepared as follows:

A. Vitamin and antibiotic standard—15 grams of the vitamin and antibiotic mixture of Example 1 were dispersed in 100 milliliters of water and the turbidity of this solution compared with that of a similar 100 milliliter solution which included 1.3 grams of p-diisobutylphenoxyethoxyethyl dimethyl benzyl ammonium chloride.

B. Vitamin standard—12 grams of the vitamin mixture of Example 2 were dispersed in 100 milliliters of water and the turbidity of this solution compared with that of a similar 100 milliliter solution which included 1.3 grams of the p-diisobutylphenoxyethoxyethyl dimethyl benzyl ammonium chloride.

A scale was established for visually measuring the effectiveness of other quaternary ammonium salts in reducing the turbidity of the standard solutions A and B as follows:

Good—marked decrease in turbidity
Fair—some decrease in turbidity
Poor—negligible decrease in turbidity
No good—no detectable decrease in turbidity or formation of objectionable gum.

The decrease in turbidity caused by addition of 1.3 grams of p-diisobutylphenoxyethyoxyethyl dimethyl benzyl ammonium chloride to each of the standard solutions A and B was equated to the rating good. A number of other quaternary ammonium salts were then added to the standard solutions at levels of 50 to 100 parts per million and the effectiveness of such compounds in decreasing turbidity was measured as follows:

| Quaternary Ammonium Salt | Turbidity Rating | |
|---|---|---|
| | 100 p.p.m. | 50 p.p.m. |
| p-Diisobutylcresoxyethoxyethyl dimethyl benzyl ammonium chloride: | | |
| Standard A | Good | Fair. |
| Standard B | Good | Fair. |
| p-Diisobutylphenoxyethoxyethyl dimethyl benzyl ammonium chloride: | | |
| Standard A | Good | Good. |
| Standard B | Good | Good. |
| Tetratradecyl dimethyl benzyl chloride, 50%; urea, 50%: | | |
| Standard A | Good | Poor. |
| Standard B | Poor | Poor. |
| Methyldodecylbenzyl trimethyl ammonium chloride: | | |
| Standard A | Good | Good. |
| Standard B | Good | Good. |
| Mixture of dodecyl, tetradecyl, and hexadecyl benzyl dimethyl ammonium chlorides: | | |
| Standard A | Good | Good. |
| Standard B | Fair | Fair. |
| Tetradecyl methyl ethyl benzyl ammonium chloride: | | |
| Standard A | Good | Good. |
| Standard B | Good | Good. |
| Mixture of dodecyl, tetradecyl, hexadecyl, and octadecyl dimethyl benzyl ammonium chlorides: | | |
| Standard A | Good | Good. |
| Standard B | Good | Good. |
| Mixture of 95% tetradecyl, 2½% dodecyl, 2½% octadecyl dimethyl benzyl ammonium chlorides: | | |
| Standard A | Good | Good. |
| Standard B | Good | Good. |
| Methylnonylbenzyl trimethyl ammonium chloride: | | |
| Standard A | Good | Good. |
| Standard B | Good | Good. |
| Mixture of alkyl dimethyl benzyl ammonium chlorides in which the alkyl groups contain from 8 to 18 carbon atoms: | | |
| Standard A | Good | Good. |
| Standard B | Good | Good. |

As can be seen, substantially all of these quaternary salts were effective for decreasing the turbidity of the standard solutions to the degree given by the p-diisobutylphenoxyethoxyethyl dimethyl benzyl ammonium chloride.

The decrease in turbidity being a direct indication of the anti-clogging effectiveness of the test compounds, these results demonstrated that the quaternary ammonium salts which were rated were suitable for preventing the clogging of float and valve orifices in automatic metering systems used for dispensing water to the drinking troughs of poultry and animal pens.

In addition to the quaternary ammonium salt mentioned hereinabove, we have found that an additional nitrogen compound namely piperazine and its acid salts are also effective for improving the characteristics of medicated drinking waters to the degree where clogging is prevented. By the term acid salts, we refer to both the mono and di-acid salts of piperazine, for example, piperazine mono- and di-hydrochloride, piperazine mono- and di-citrate, piperazine mono- and di-sulfate and similar acid salts. Use of piperazine and its salts is also of benefit in that these materials provide an anthelmintic effect upon the poultry and animals. In order to demonstrate the effectiveness of piperazine salts, the following determinations of the reduction in turbidity of the standard solutions A and B of Example 4 were made:

| Piperazine Salt | Turbidity Rating | |
|---|---|---|
| | 100 p.p.m. | 50 p.p.m. |
| Piperazine dihydrochloride: | | |
| Standard A | Fair | Good. |
| Standard B | Fair | Good. |
| Piperazine dicitrate: | | |
| Standard A | Fair | Good. |
| Standard B | Fair | Good. |

It will be understood that it is intended to cover all changes and modifications of the preferred embodiments of the invention herein chosen for the purpose of illustration which do not constitute departures from the spirit and scope of the invention.

We claim:

1. A composition for providing free-flowing medicated drinking water for poultry and animals which comprises at least one therapeutic substance selected from the group consisting of vitamins and antibiotics in admixture with about 4% to about 13% of a quaternary ammonium salt by weight based on the weight of said therapeutic substance, said quaternary ammonium salt having the formula:

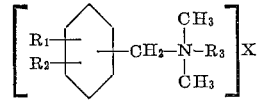

in which $R_1$ is selected from the group consisting of hydrogen and alkyl having from one to four carbon atoms, $R_2$ is selected from the group consisting of hydrogen and alkyl having from ten to sixteen carbon atoms, $R_3$ is selected from the group consisting of alkyl having from one to eighteen carbon atoms, alkoxy, phenoxyalkoxyalkyl and cresoxyalkoxyalkyl, and X is an inorganic anion.

2. A composition for providing free-flowing medicated drinking water for poultry and animals which comprises an aqueous dispersion containing at least one therapeutic substance selected from the group consisting of vitamins and antibiotics and about 4% to about 13% of a quaternary ammonium salt by weight based on the weight of said therapeutic substance, said quaternary ammonium salt having the formula:

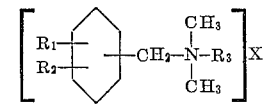

in which $R_1$ is selected from the group consisting of hydrogen and alkyl having from one to four carbon atoms, $R_2$ is selected from the group consisting of hydrogen and alkyl having from ten to sixteen carbon atoms, $R_3$ is selected from the group consisting of alkyl having from one to eighteen carbon atoms, alkoxy, phenoxyalkoxyalkyl and cresoxyalkoxyalkyl, and X is an inorganic anion.

3. A composition in accordance with claim 2 in which the concentration of said therapeutic substance is about 700 to 1200 parts per million parts by weight of said dispersion.

4. A composition for providing free-flowing medicated drinking water for poultry and animals which comprises an aqueous dispersion containing in each gallon thereof the following therapeutic substances in the stated amounts:

| | |
|---|---:|
| Procaine penicillin G, units | 245,000 |
| Streptomycin, mgs. | 290 |
| Vitamin A, U.S.P. units | 16,000 |
| Vitamin B–12, mcg. | 77 |
| Vitamin $D_3$, I.C. units | 490 |
| Vitamin E, INT. units | 6 |
| Pyridoxine, mgs. | 7 |
| d-Calcium pantothenate, mgs. | 38 |
| Niacin, mgs. | 60 |
| Riboflavin, mgs. | 6 |
| Menadione sodium bisulfate, mgs. | 10 | and containing from about 4% to about 13% of a quaternary ammonium salt selected from the group consisting of p-diisobutylphenoxyethoxyethyl dimethyl benzyl ammonium chloride and p-diisobutylcresoxyethoxyethyl dimethyl benzyl ammonium chloride, the amount of said quaternary ammonium salt being based on the total weight of said therapeutic substances.

5. A composition for providing free-flowing medicated drinking water for poultry and animals which comprises an aqueous dispersion containing in each gallon thereof the following therapeutic substances in the stated amounts:

| | |
|---|---:|
| Vitamin A, U.S.P. units | 8,000 |
| Vitamin B–12, mcg. | 80 |
| Vitamin $D_3$, I.C. units | 8,000 |
| d-Calcium pantothenate, mg. | 96 |
| Menadione sodium bisulfate, mg. | 4 |
| Niacin, mg. | 110 |
| Riboflavin, mg. | 30 | and containing from about 4% to about 13% of a quaternary ammonium salt selected from the group consisting of p-diisobutylphenoxyethoxyethyl dimethyl benzyl ammonium chloride and p-diisobutylcresoxyethoxyethyl dimethyl benzyl ammonium chloride, the amount of said quaternary ammonium salt being based on the total weight of said therapeutic substances.

References Cited by the Examiner
UNITED STATES PATENTS

| | | | |
|---|---|---|---|
| 2,540,131 | 2/1951 | Littler | 167—53 |
| 2,694,668 | 11/1954 | Fricke | 99—1 |
| 2,696,455 | 12/1954 | Blair | 167—53 |
| 2,951,009 | 8/1960 | Jensen | 167—53 |
| 3,060,087 | 10/1962 | Kingsbury | 167—53 |
| 3,102,074 | 8/1963 | Brown | 167—53 |

OTHER REFERENCES

Snell, Industrial and Engineering Chemistry, vol. 35.

Tomlinson, Manufacturing Chem., vol. 15, No. 7, July 1944, pages 249–252.

Stephenson, Veterinary Drug Encyclopedia and Therapeutic Index, eighth edition, 1960, page 225.

JULIAN S. LEVITT, *Primary Examiner.*

MORRIS O. WOLK, FRANK CACCIAPAGLIA,
*Examiners.*

S. ROSEN, *Assistant Examiner.*